United States Patent [19]

Cumming

[11] Patent Number: 4,926,980
[45] Date of Patent: May 22, 1990

[54] AUTOMATIC BRAKE ADJUSTING MECHANISM

[75] Inventor: James C. Cumming, Pleasant Ridge, Mich.

[73] Assignee: Rockwell International Corporation, Pittsburgh, Pa.

[21] Appl. No.: 740,157

[22] Filed: Jun. 3, 1985

Related U.S. Application Data

[63] Continuation of Ser. No. 681,164, Dec. 13, 1984, abandoned, which is a continuation of Ser. No. 629,013, Jul. 9, 1984, abandoned, which is a continuation of Ser. No. 556,805, Dec. 1, 1983, abandoned, which is a continuation of Ser. No. 273,537, Jun. 15, 1981, abandoned.

[51] Int. Cl.⁵ .................... F16D 65/60; F16D 65/54
[52] U.S. Cl. ......................... 188/79.55; 188/196 BA
[58] Field of Search ............... 188/196 BA, 200, 202, 188/79.51, 79.55

[56] References Cited

U.S. PATENT DOCUMENTS

| | | | |
|---|---|---|---|
| 1,852,174 | 4/1932 | Lyman et al. | 188/79.5 K |
| 2,449,459 | 9/1948 | Eckert | 188/60 X |
| 3,077,956 | 2/1963 | Maloney | 188/196 BA X |
| 3,093,214 | 6/1963 | Polanin | 188/196 BA X |
| 3,121,478 | 2/1964 | Bostwick | 188/79.5 K |
| 3,261,433 | 7/1966 | Page | 188/79.5 K X |
| 3,727,728 | 4/1973 | Bostwick | 188/79.5 K |
| 3,949,840 | 4/1976 | Cumming et al. | 188/79.5 K |
| 4,019,612 | 4/1977 | Mathews et al. | 188/79.5 K X |
| 4,056,175 | 11/1977 | Newstead et al. | 188/196 BA |

FOREIGN PATENT DOCUMENTS

| | | | |
|---|---|---|---|
| 878002 | 9/1961 | United Kingdom | 188/196 BA |
| 959717 | 6/1964 | United Kingdom | 188/196 BA |

*Primary Examiner*—George E. A. Halvosa

[57] ABSTRACT

Automatic brake adjusting mechanism which includes a ratchet member having helical teeth about a cylindrical outer surface, a pawl, structure biasing the pawl into engagement with the helical teeth of the ratchet member and an elongate release pin associated with the pawl whereby the release pin may be moved against the biasing of the structure to disengage the pawl from the ratchet member thereby permitting the brake shoes to be backed away from a brake drum without disassembling component parts of the mechanism.

2 Claims, 3 Drawing Sheets

AUTOMATIC BRAKE ADJUSTING MECHANISM

This application is a continuation of application Ser. No. 681,164 filed 12/13/84 which is a continuation of Ser. No. 629,013 filed 7/9/84, which is a continuation of Ser. No. 556,805 filed 12/1/83, which is a continuation of application Ser. No. 273,537 filed 6/15/81, all now abandoned.

BACKGROUND OF THE INVENTION

This invention is directed to an automatic brake adjusting mechanism for a vehicle brake assembly which automatically adjusts for brake shoe lining wear in response to movement of the brake shoes beyond a predetermined distance. More specifically, the invention is directed to mechanism which permits the automatic adjusting mechanism to be readily disengaged without disassembling component parts thereof.

One such automatic adjusting mechanism which employs a pawl and ratchet responsive to overtravel of a cam brake actuating lever on the brake application stroke to effect automatic slack adjustment upon return movement of the lever is disclosed in U.S. Pat. No. 3,949,840. That lever and automatic adjusting mechanism, as well as other mechanisms used for the same purpose, incorporates means for manually adjusting the brake actuating lever relative to the cam shaft. In the automatic adjusting mechanism disclosed in the above-referenced patent, the orientation of the teeth provided to the pawl permits rotation of the ratchet member to move or position the brake shoes closer to the brake drum and thereby adjust for lining wear. However, the orientation of the teeth on the pawl prevents rotation of the ratchet member in the opposite direction and must be disengaged when the manual means is employed to move or reposition the brake shoes further away from the brake drum. The pawl may be removed from the assembly to permit movement of the brake shoes away from the brake drum; but the parts are relatively small and may be misplaced, lost or improperly reinstalled when such removal is attempted in the field.

The brake actuator motors may also be provided with spring type auxiliary or safety brake mechanisms such as that disclosed in U.S. Pat. No. 3,020,094. Such auxiliary or safety brake mechanisms utilize a spring normally compressed to an inoperative position by brake system air pressure which expands and moves the actuating lever to apply the brake in the absence of brake system air pressure. Such devices are useful as parking brake mechanisms when the vehicle is not being operated and function as emergency or safety brake mechanisms in the event the vehicle loses its brake system air pressure when in operation. Such devices pose a problem, however, when they are active as an auxiliary, parking brake on a vehicle such as a trailer which does not have its own source of air pressure to release the spring. This may occur with a trailer separated from its towing vehicle and parked along side a highway or in a truck, railroad or ship terminal yard when it becomes necessary to shuttle the trailer; as for example, to load it on a railroad flat car or ship.

SUMMARY OF THE INVENTION

The present invention avoids certain of the foregoing problems of the prior art by providing in an automatic slack adjusting mechanism means for readily disengaging a spring biased pawl engaged with helical teeth provided to a ratchet member to manually move or reposition a brake shoe relative to a surrounding brake drum without disassembling component parts of the automatic adjusting mechanism.

The present invention is an improved brake adjusting mechanism for a vehicle brake assembly having a movable brake shoe with a friction lining adapted to engage a surrounding brake drum which includes a housing having a first bore, a ratchet member slidably and rotatably mounted in the first bore and having helical teeth about a generally cylindrically outer surface thereof and a threaded connection with means operative to position a brake shoe relative to a surrounding brake drum, a second bore in the housing communicating with the first bore and an elongate element mounted for rectilinear movement in the second bore. The elongate element is provided with a pawl engaged with the helical teeth of the ratchet member. One end of the elongate element extends out of the second bore and means are provided biasing the pawl into engagement with the ratchet member whereby the pawl may be disengaged from the ratchet member by manually moving the elongate element against the biasing means.

BRIEF DESCRIPTION OF THE DRAWINGS

In the drawings wherein like reference numerals refer to like parts.

DESCRIPTION OF THE INVENTION

Figure 1:
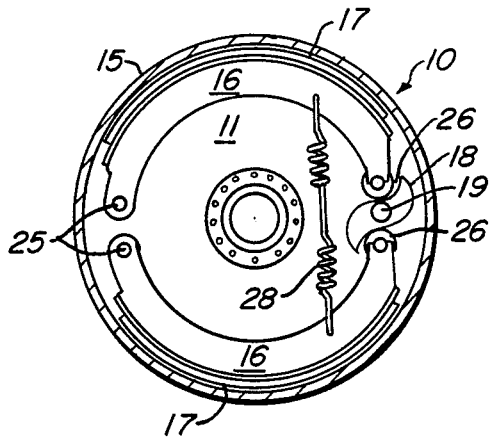
FIG. 1 is a side elevation partly in section of a cam actuated vehicle brake assembly.
Figure 2:
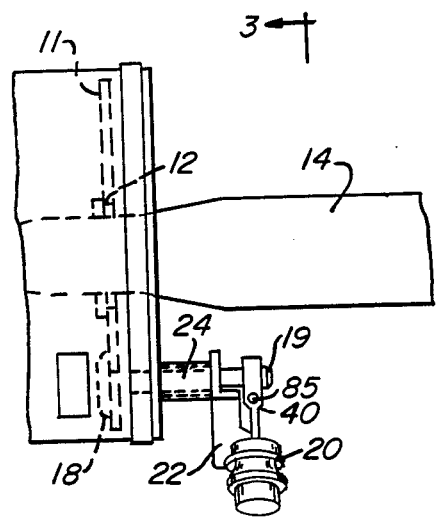
FIG. 2 is a top plan view of the vehicle brake assembly of FIG. 1.
Figure 3:
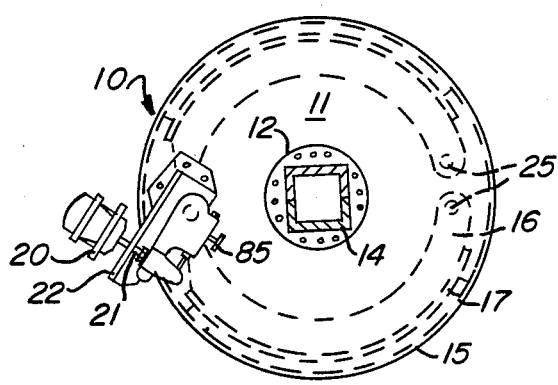
FIG. 3 is a view taken on the line 3—3 of FIG. 2.

In FIGS. 1-3, the present invention is shown in combination with a cam actuated brake assembly 10 supported by a spider 11 secured to a flange 12 which in turn is welded to a vehicle axle 14. The brake assembly 10 is comprised of a brake drum 15, a pair of brake shoes 16, a brake actuating cam 18 non-rotatably secured to a camshaft 19, a spring brake actuating motor 20 having a reciprocating brake actuating rod 21 and a lever 40 operatively connecting the brake actuating rod 21 and the camshaft 19. The brake shoes 16 are each respectively provided with friction linings 17.

The actuating motor 20 is supported by an angle bracket 22 secured as by welding to one end of a tube 24. The tube 24 is welded at its other end to a mounting bracket secured to the spider 11 and encloses a length of the camshaft 19.

The brake shoes 16 are each respectively mounted for pivotal movement about a pin 25 fixed to the spider 11. The opposite ends of the brake shoes 16 are provided with roller followers 26 biased into engagement with an S-type brake actuating cam 18 by a spring 28.

The brake assembly 10 as thus far described is well known in the art and is normally operated by depressing the vehicle brake pedal which supplies fluid pressure, usually air, to the service brake chamber of the actuating motor 20. Air pressure is independently supplied to the auxiliary brake chamber to compress the spring brake while the vehicle is in operation and has brake air pressure. The fluid pressure operating on a piston or diaphragm in the service chamber of motor 20 forces the actuating rod 21 outwardly of the motor housing thereby rotating the lever 40 and camshaft 19 counterclockwise as viewed in FIG. 3 about the axis of the camshaft 19. The camshaft 19 rotates the brake actuating cam 18 in a clockwise direction as viewed in FIG. 1. Rotary movement of the cam 18 as transmitted through the roller followers 26 forces the brake shoes 16 to pivot about the pins 25 until the brake shoe linings 17 are pressed into frictional contact with the brake drum 15. When the brakes are released, fluid pressure is exhausted from the service chamber of actuator motor 20 and the actuating rod 21 and lever 40 are returned to their normally retracted positions as shown in FIG. 3. When the fluid pressure is exhausted from the service chamber of actuating motor 20, the brake shoes 16 and the linings 17 are returned by spring 28 to their normal running position as shown in FIG. 1 where a clearance space is provided between the linings 17 and the brake drum 15. The spring 28 acting through the brake shoes 16 and roller followers 26 also assists in returning the cam 18, camshaft 19 and lever 40 to their normal non-braking position as shown in FIGS. 1-3.

The invention will now be described with particular reference to FIGS. 4 through 7 where the lever 40 and the automatic slack adjusting mechanism are shown in detail.

The lever 40 is an elongated housing having an opening 41 adjacent one end and a bore 42 extending partially along the length of the housing. A shaft 44 having a worm 45 formed integral therewith is rotatably mounted in the bore between a shoulder 46 and retaining ring 48. A seal 49 is provided axially outward of the retaining ring 48. The internal surfaces of the ring 48 and the shoulder 46 provide radial bearing surfaces for the worm 45. The end of the shaft 44 axially outward of the worm seal 49 is formed as a square driving head 50 to provide an externally accessible means for manually rotating the shaft. The opposite end of the shaft 44 extends beyond the shoulder 46 and has a longitudinally movable rotary driving splined connection internally of a or ratchet member 51 provided in the form of a hollow cylinder. The exterior surface portion of the ratchet member concentric with the interior splined connection to the shaft 44 is provided with a plurality of circumferentially spaced, axially extending helical teeth 52.

Figure 4:
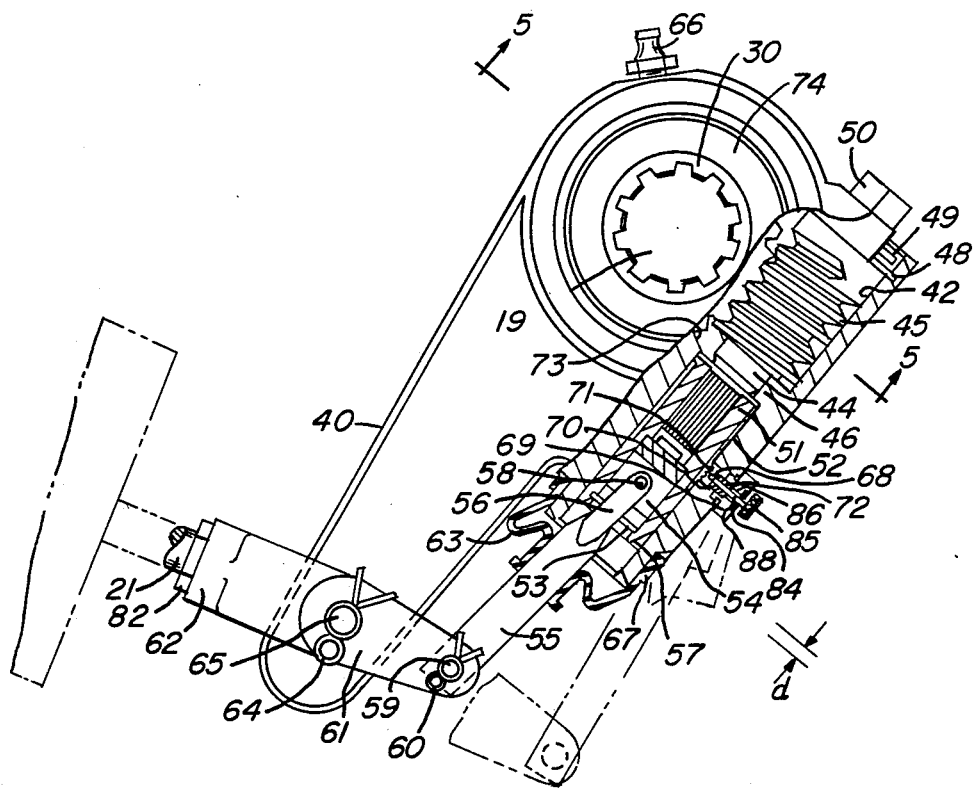
FIG. 4 is an enlarged side elevation view of the lever and automatic slack adjusting mechanism of the present invention with part of the mechanism housing broken away for clarity of illustration.

A piston 54 is freely slidably disposed within the interior of ratchet member 51. The hollow interior of the ratchet member 51 is provided with a circumferentially extending groove axially outward of the piston 54. A retaining ring 57 is fitted to the groove 53 to prevent the piston 54 from being withdrawn from the ratchet member and to provide a piston engaging abutment for moving the ratchet member axially outward of the bore 42 in response to axially outward movement of the piston 54 beyond a predetermined distance d, as shown in FIG. 4.

The piston 54 is diametrically slotted to receive the flat end 56 of a rod 55 pivotally connected to the piston 54 by a pin 58. The opposite end of the rod 55 is pivotally connected by means of a pin 59 and cotter key 60 to the bifurcated end of a clevis 61. The opposite end of the clevis 61 is provided with an internally threaded bore 62 which receives the threaded end of brake actuating rod 21. The end of the lever 40 opposite the opening 41 extends between the legs of the bifurcated end of clevis 61 where it is pivotally connected intermediate the ends of the clevis by means of a cotter key 64 and pin 65 passing through an appropriate sized hole in the lever.

The end of the bore 42 receiving the rod 55 is closed by a flexible boot seal 63 elastically snugly fitted about the rod 55 and secured by a retaining clamp 67 to a boss-like projection of the lever 40.

Figure 8:
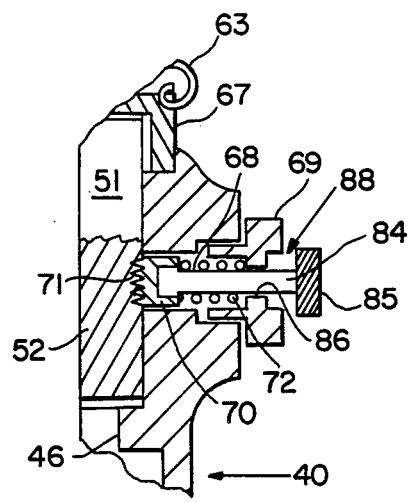
FIG. 8 is an enlarged sectional view of a portion of the structure shown by FIG. 4.

The lever 40, as best shown by FIG. 8, is also provided with a second bore 68 which intersects the bore 42 opposite the helical toothed portion 52 of ratchet member 51. The outer end of the bore 68 is internally threaded to receive an apertured cap screw 69. A pawl 70 having buttress teeth 71 formed at one end thereof is slidably received within the interior portion of bore 68 where it communicates with bore 42. A small diameter bore is also provided at the surface of the pawl 70 opposite from the buttress teeth 71 and one end of an elongate release pin 84 is press fit to the pawl bore. The release pin 84 extends through the aperture 86 of cap screw 69 out of the bore 68 where it is provided with a knurled knob 85. A spring 72 is seated at one end against a fixed interior surface of cap screw 69 and the other end is seated against a radially extending surface of the pawl 70 carried by release pin 84. The spring biases the buttress teeth 71 of pawl 70 into engagement with the helical teeth 52 provided to ratchet member 51 and the assembly of the pawl 70, spring 72, release pin 84, knurled knob 85 and cap screw 69 can be installed and removed as an integral unit. An elastomeric oil seal 88 is disposed in a recess between the release pin 84 and the apertured cap screw 69.

Figure 5:
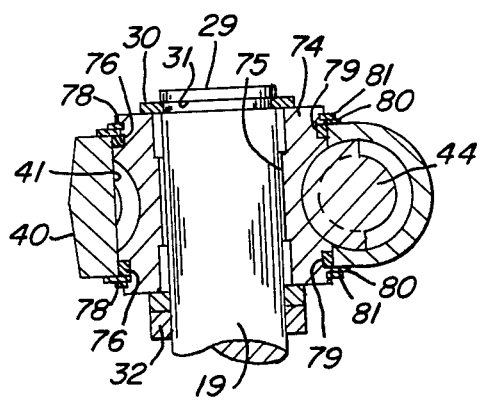
FIG. 5 is a sectional view taken on the line 5—5 of FIG. 4.

A worm gear 74 having a splined internal opening 75 is mounted for rotation in the lever opening 41. As best shown in FIG. 5, a pair of circumferentially extending grooves 76, 78 are provided adjacent each axial end of the worm gear 74. The grooves are each fitted with an annular sealing ring 79. A thrust washer 80 is provided axially outward of each annular seal 79 and a pair of retaining rings 81 seated in the grooves 78 and bearing against the axially outer surface of the thrust washers 80 prevent axial movement of the worm gear assembly while permitting the worm gear 74 to rotate within the opening 41. A fitting 66 is provided to introduce lubricant between the worm gear 74 and the opening 41, and by means of passage 73, to the bore 42.

As best shown in FIG. 4, the teeth of the worm 45 provide a threaded connection with the teeth of the worm gear 74. Rotary movement of the shaft 44 and the worm 45 in the bore 42 will rotate the worm gear 74 and the camshaft 19 relative to the lever 40 and move or position the brake shoes 16 relative to the brake drum 15. Since the worm 45 is fixed by shoulder 46 and retaining ring 48 against axial movement in the bore 42, the worm 45 also functions as a stationary part of the lever 40 and rotates the worm gear 74 and camshaft 19 when the lever 40 is pivoted about the axis of the camshaft 19 by the actuating rod 21 and clevis 61.

The lever 40 is installed to a brake assembly in the following manner. The clevis 61 is threaded to the actuating rod 21 and secured in place by a jam nut 82. The lever 40 is then axially positioned over the splined end 29 of camshaft 19 and secured in place by a retaining ring 30 fitted to a groove 31 provided adjacent the end 29 of camshaft 19. A spacer or plurality of washers 32 may be provided between the inboard surface of the lever 40 and the angle bracket 22 to align the lever 40 with the actuating rod 21. The lever 40 is then rotated about the camshaft 19 by manually rotating the square driving head 50 of shaft 44 until the openings in lever 40 and clevis 61 are aligned. The lever 40 and clevis 61 are connected by the pin 65 and cotter key 64. The rod 55 is then connected by means of the pin 59 and cotter key 60 to the clevis 61. The assembly may then be adjusted either manually by rotating the square driving head, or automatically by applying and releasing the brakes until the desired running clearance is established between the brake shoe linings 17 and the brake drum 15.

Automatic Slack Adjusting Mechanism

Automatic adjustment is effected by operation of the shaft 44, worm 45, ratchet member 51, piston 54 and the linkage 55, 61 pivotally connecting the piston 54 to the lever 40. Axial movement of the actuating rod 21 in a brake applying direction moves the clevis 61 and lever 40 counterclockwise, as viewed in FIGS. 3 and 4, about the axis of the camshaft 19. During such movement, the clevis 61 traverses an arcuate path as shown by the chain line in FIG. 4 and, pivoting about the pin 65, moves the rod 55 and piston 54 outward relative to the ratchet member 51 and bore 42 as shown by phantom lines. The spacing or distance d provided between the piston 54 and the retaining ring 57 permits the piston 54 to move freely within that axial length of the ratchet member. The distance d is calculated relative to the arcuate mvoement of the camshaft 19 which is required to take up the normal running clearance desired between the brake lining 17 and the brake drum 15 and a substantial portion of that arcuate movement which produces distortion in the brake assembly. The remaining arcuate movement producing distortion in the assembly and the lining wear allowable before automatic adjustment is to be effected are accommodated by the axial length of each of the buttress teeth 71. Thus, as long as the brake linings 17 have not experienced appreciable wear, the piston 54 will abut the ring 57 and move the ratchet member 51 outward relative to the bore 42 and pawl teeth 71. After an acceptable amount of lining wear, the ratchet member 51 moving relative to the spring biased pawl 70 will cause the pawl 70 to retract and engage an adjacent set of helical teeth 52 on the ratchet member 51. When the service brake is released, the lever 40 and ratchet member 51 return to the normal position as shown in FIG. 4 and the buttress teeth 71 of the pawl 70 rotate the ratchet member 51, shaft 44 and worm 45 to effect a predetermined arcuate movement of the worm gear 74 and camshaft 19. This will effect a slight rotary adjustment of the S-type actuating cam 18 as shown in FIG. 1 and reposition the brake shoes 16 outwardly until the desired running clearance is again established between the linings 17 and the brake drum 15.

To manually adjust the mechanism to reposition or move the brake shoes 16 away from the surrounding brake drum 17, one need only grasp the knurled knob 85 of release pin 84 and withdraw the pin slightly out of the bore 68 thereby compressing the spring 72 and withdrawing the buttress teeth 71 of the pawl 70 from engagement with the helical teeth 52 on the ratchet member 51. Once the pawl is disengaged from the ratchet member 51, a wrench can be applied to rotate the square driving head 50 and the worm 45 which in turn will rotate the worm gear 74 and camshaft 19 in a clockwise direction as shown in FIGS. 3 and 4 to move or "back off" the brake shoes relative to the brake drum 15. This is important, for example, when it is necessary to move a vehicle such as a trailer equipped with a spring brake actuator motor and parked at a railway or truck terminal or on dockside without a source of air pressure to compress the spring and release the auxiliary parking brake. In such an instance, an attendent can withdraw the release pin 84 and back off the brake shoes by rotating the square driving head 50 as described above to permit movement of the vehicle without disassembling the automatic adjusting mechanism.

Figure 6:
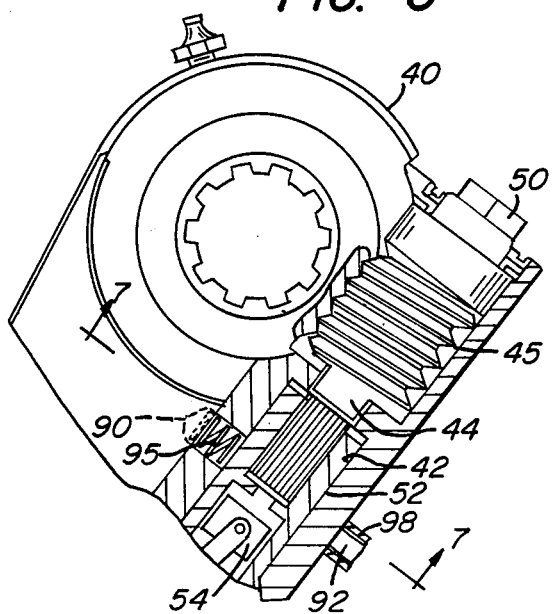
FIG. 6 is a partial view similar to FIG. 4 showing an alternate embodiment of the invention.
Figure 7:
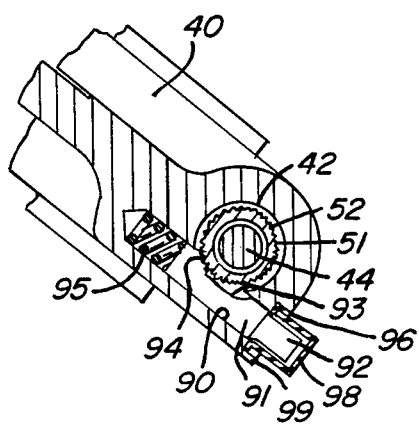
FIG. 7 is a sectional view taken on the line 7—7 of FIG. 6.

An alternate embodiment of the invention will be described. In FIGS. 6 and 7, the arrangement of the worm gear within opening 41 of lever 40 and the arrangement of the shaft 44, worm 45, ratchet member 51 and piston 54 within a first bore 42 provided to the housing of lever 40 is identical to the arrangement previously discussed in connections with FIGS. 4 and 5 and the same reference numerals have been utilized to identify parts common with the embodiment of FIGS. 1 through 5. A second bore 90 is provided which not only communicates with the first bore 42 but traverses or extends laterally on both sides of the first bore 42. An elongate release pin 91 is disposed partly within the second bore 90 with one end 92 extending axially out of the bore 90. The pin 91 is undercut at 93 to provide clearance for the cylindrical surface of the ratchet member 51 and the helical teeth 52. The axially inner end of the undercut 93 is machined to provide a plurality of buttress teeth 94 for engagement with the helical teeth 52 of ratchet member 51. The intermediate undercut portion 93 of pin 91 traverses the ratchet member 51 with the buttress teeth 94 forming a pawl on one side of the axis of ratchet member 51 and the end 92 of pin 91 extending out of the second bore 90 on the other side of the axis of ratchet member 51. A spring 95 is seated at one end in abutment with the inner end of the second bore 90 and seated at its opposite end against the axially inner end surface of the release pin 91 to bias the pin, and more specifically, the buttress teeth 94 into engagement with the helical teeth 52 provided to the cylindrical outer surface of the ratchet member 51.

The second bore 90 is counterbored to provide an annular recess 96 concentric with the outer end 92 of release pin 91. A deformable protective cap 98, closed at one end and having a flange seated in the recess 96 prevents moisture and debris from entering the second bore 90. The deformable protective cap 98 may be formed from any suitable flexible material and in the disclosed embodiment is comprised of a rubber cap 98 having an annular metal ring 99 sized to provide an interference fit between the cap flange and the recess 96.

The alternate embodiment of FIGS. 6 and 7 may be utilized to move or "back off" the brake shoes 16 relative to the brake drum 15 by manually pressing the deformable protective cap 98 and thereby moving the outer end 92 of release pin 91 to compress the spring 95 and disengage the pawl teeth 94 from the helical teeth of ratchet member 51. The brake shoes may then be backed away from the brake drum by manual rotation of a wrench applied to the square driving head 50 of shaft 44. The foregoing cam actuating lever and automatic slack adjusting mechanism has been described in combination with an S-type oscillating rotary cam actuated drum type brake system. The actuating lever and automatic adjusting mechanism is not limited to use in a drum type brake system but may be used in combination with other cam actuated brake systems employing an actuating lever; for example, a cam actuated disc type brake system or in a wedge actuated brake system utilizing a pawl and ratchet automatic adjusting mechanism.

The invention may also be embodied in other specific forms without departing from the spirit or essential characteristics thereof. The foregoing description is therefore is to be considered as illustrative and not restrictive, the scope of the invention being defined by the appended claims, and all changes which come within the meaning and range of equivalency of the claims are therefore intended to be embraced thereby.

I claim:

1. A brake adjusting mechanism for a vehicle brake assembly having a movable brake shoe (16) with a friction lining (17) adapted to engage a surrounding brake drum (15);

a housing (40) having a first bore (42);

a ratchet member (51) slidably and rotatably mounted in said first bore (42), said ratchet member (51) having helical teeth about a generally cylindrical outer surface thereof and a threaded connection with means (44) operative to position the brake shoe relative to the surrounding brake drum (15);

a second bore (90) in said housing (40) and communicating with said first bore (42);

an elongate element (91) mounted for rectilinear movement in said second bore (90), said elongate element (91) having a pawl (94) engaged with said helical teeth of said ratchet member (51); and means biasing (95) said pawl into engagement with said ratchet member (51);

characterized in that one end (92) of said elongate element (91) extends out of said second bore (90); in that said second bore (90) traverses said first bore (42), an intermediate portion of said elongate element (91) traverses said ratchet member (52), said pawl is disposed on one side of said ratchet member (52) and said one end (92) of said elongate element (91) is disposed on the other side of said ratchet member (52), said pawl (94) being formed as an integral part of said elongate element (91) and said means biasing said pawl comprises a spring (95) seated at one end against an abutment internal of said second bore (90) and seated at the other end against said elongate element (91), and in that said pawl is adapted to be disengaged from said ratchet member (52) by manually pressing on said one end (92) of said elongate element (91) to move said elongate element (91) against said biasing means (95).

2. The brake adjusting mechanism defined by claim 1 including a deformable protective cap (98) seated in said second bore (90) and enclosing said one end (92) of said elongate member (91) whereby said elongate element may be moved by manually depressing said protective cap.

* * * * *